United States Patent [19]
Nemecek et al.

[11] Patent Number: 5,953,139
[45] Date of Patent: Sep. 14, 1999

[54] WAVELENGTH DIVISION MULTIPLEXING SYSTEM

[75] Inventors: Joseph E. Nemecek, Worcester; Michael J. Noonan, Shrewsbury; Amaresh Mahapatra, Acton, all of Mass.

[73] Assignee: CFX Communications Systems, LLC, Northboro, Mass.

[21] Appl. No.: 08/670,722

[22] Filed: Jun. 21, 1996

Related U.S. Application Data

[63] Continuation-in-part of application No. PCT/US96/03199, Mar. 6, 1996.

[51] Int. Cl.$^6$ .................................................. H04J 14/02
[52] U.S. Cl. ........................... 359/124; 359/133; 359/183
[58] Field of Search ..................................... 359/124, 127, 359/129, 133, 131, 580, 181, 183; 385/24, 17, 18

[56] References Cited

U.S. PATENT DOCUMENTS

| | | | |
|---|---|---|---|
| 3,952,260 | 4/1976 | Prochazka et al. | 330/149 |
| 4,244,045 | 1/1981 | Nosu et al. | 370/3 |
| 4,715,027 | 12/1987 | Mahapatra et al. | 370/3 |
| 4,768,849 | 9/1988 | Hicks, Jr. | 350/96.15 |
| 5,002,353 | 3/1991 | Johnson | 350/96.14 |
| 5,005,935 | 4/1991 | Kunikane et al. | 350/96.16 |
| 5,031,235 | 7/1991 | Raskin et al. | 455/612 |
| 5,107,360 | 4/1992 | Huber | 359/124 |
| 5,109,441 | 4/1992 | Glaab | 385/1 |
| 5,119,447 | 6/1992 | Trisno | 385/3 |
| 5,148,503 | 9/1992 | Skeie | 385/3 |
| 5,157,744 | 10/1992 | Korotky | 385/2 |
| 5,161,044 | 11/1992 | Nazarathy et al. | 359/157 |
| 5,161,206 | 11/1992 | Djupsjobacka | 385/2 |
| 5,168,534 | 12/1992 | McBrien et al. | 385/3 |
| 5,199,086 | 3/1993 | Johnson et al. | 385/2 |
| 5,210,633 | 5/1993 | Trisno | 359/194 |
| 5,222,089 | 6/1993 | Huber | 372/26 |
| 5,230,028 | 7/1993 | Lin et al. | 385/3 |

(List continued on next page.)

FOREIGN PATENT DOCUMENTS

| | | |
|---|---|---|
| 164170 | 12/1985 | European Pat. Off. . |
| 0242802A2 | 10/1987 | European Pat. Off. . |
| 0251748 | 1/1988 | European Pat. Off. . |
| 04752331A2 | 3/1992 | European Pat. Off. . |
| 20116911 | 7/1979 | United Kingdom . |
| 91/06882 | 5/1991 | WIPO . |
| 96/13104 | 5/1996 | WIPO . |

OTHER PUBLICATIONS

Korotky, S. K., and Ridder, R. M.,"Dual Parallel Modulation Schemes for Low–Distortion Analog Optical Transmission," *J. on Selected Areas in Communications*, 8(7):1377–1380 (Jan. 1990).

Brooks, J. L., et al., "Implementation and Evaluation of a Dual Parallel Linearization System for AM–SCM Video Tranmission," *J. Lightwave Technology* 11(1):34–41 (Jan. 1993).

(List continued on next page.)

*Primary Examiner*—Rafael Bacares
*Attorney, Agent, or Firm*—Hamilton, Brook, Smith & Reynolds, P.C.

[57] ABSTRACT

An analog lightwave communication system comprises at least two optical transmitters for providing optical information signals at different optical wavelengths. A dense wavelength division multiplexer includes at least two inputs for receiving the optical information signals from the optical transmitters and multiplexes the optical information signals to a composite optical signal at an output. Each input of the dense wavelength division multiplexer comprises at least one optical resonant cavity comprising first and second reflecting materials spaced to permit resonance at a selected wavelength. A fiber optic transmission system coupled to the output of the dense wavelength division multiplexer receives the composite optical signal.

20 Claims, 5 Drawing Sheets

U.S. PATENT DOCUMENTS

| | | | |
|---|---|---|---|
| 5,249,243 | 9/1993 | Skeie | 385/3 |
| 5,278,923 | 1/1994 | Nazarathy et al. | 385/3 |
| 5,289,550 | 2/1994 | Plastow | 385/9 |
| 5,309,532 | 5/1994 | Chang et al. | 385/3 |
| 5,321,543 | 6/1994 | Huber | 359/187 |
| 5,327,279 | 7/1994 | Farina et al. | 359/180 |
| 5,361,156 | 11/1994 | Pidgeon | 359/161 |
| 5,373,389 | 12/1994 | Huber | 359/195 |
| 5,400,166 | 3/1995 | Huber | 359/173 |
| 5,504,609 | 4/1996 | Alexander et al. | 359/125 |
| 5,532,864 | 7/1996 | Alexander et al. | 359/177 |
| 5,557,439 | 9/1996 | Alexander et al. | 359/130 |
| 5,583,683 | 12/1996 | Scobey | 359/127 |
| 5,673,129 | 9/1997 | Mizrachi | 359/124 |
| 5,696,615 | 12/1997 | Alexander | 359/134 |
| 5,786,915 | 7/1998 | Scobey | 359/127 |
| 5,808,763 | 9/1998 | Duck et al. | 359/127 |

OTHER PUBLICATIONS

Betts, G. E., "Linearized Modulator for Suboctave–Bandpass Optical Analog Links," *IEEE, Trans. MTT*, pp. 1–27 (Dec. 1994).

Farwell, M. L., et al., "Increased Linear Dynamic Range by Low Biasing the Mach–Zehnder Modulator," *IEEE Photonics Technology Letters*, 5(7):779–782 (Jul. 1993).

Johnson, L. M., and Roussell, H. V., "Reduction of Intermodulation Distortion in Interferometric Optical Modulators," *Optics Letters*, 13;928–930 (Oct. 1988).

Chang, W. S. C., "Analog Modulation with Large Linear Dynamic Range" Final Report 1991–92 for MICRO Project #91–020, Univ. of California at San Diego, LaJolla, CA.

Gopalakrishnan, G. K. et al., "A LiNbO$_3$ Microwave–Optoelectronic Mixer with Linear Performance," *IEEE MTTS–S Digest*, pp. 1055–1058 (1993).

Skeie, H., and Johnson, R. V., "Linearization of Electro–Optic Modulators By a Cascade Coupling of Phase Modulating Electrodes," *Integrated Optical Circuits* SPIE vol. 1583, pp. 153–164 (1991).

Izutsu, M., et al., "Picosecond Signal Sampling and Multiplication By Using Integrated Tandem Light Modulators," *J. of Lightwave Technology*, 1(1):285–289 (Mar. 1983).

"Increase Your System Capacity with AELINK Laser Transmission Products," sales brochure, AEL Industries, Inc. 91 page), (1995).

"Fiber–Optic CATV Transmitter", sales brochure ALY–7832–01, (2 pages), AEL Industries, Inc.

Fiber–Optic CATV Transmitter, sales brochure ALY–7832–03, (2 pages), AEL Industries, Inc.

"Fiber–Optic CATV Tranmitter," sales brochure ALY–7832–04, (2 pages), AEL Industries, Inc.

"High–Performance Optical Links for the Cable and Cellular Industries," sales brochure, (4 pages), AEL Industries, Inc. (Nov., 1994).

Ishii, Y. and Tsukamoto, K., "Coherent Fiber–Optic Microcellular Radio Communication System Using a Novel FR–to–Optic Conversion Scheme," *IEEE Transactions on Microwave Theory and Techniques*, vol. 43, No. 9 (Sep. 1995).

Childs, R. B., and O'Byrne, V. A., "Multichannel AM Video Tranmission Using a High–Power Nd: YAG Laser and Linearized External Modulator," *IEEE Journal on Selective Areas in Communications*, vol. 8, No. 7:1369–1376 (Sep. 1990).

Prochazka, A., et al., "Amplifier Linearization by Complementary Pre– or Post– Distortion*," *IEEE Transactions on Cable Television*, vol. CATV–1, No. 1: 31–39 (Oct. 1976).

Lotsch, H. K. V., "Theory of Nonlinear Distortion Produced in a Semiconductor Diode," *IEEE Transactions on Electron Devices*, vol. ED–15, No. 5:294–307 (May 1968).

Buckley, R. H., et al., "A Rugged Twenty Kilometer Fiber Optic Link for 2 to 18 Gigahertz Communications," Proceedings of the International Society for Optical Engineering, vol. 1371 (1990).

Yurek, A. M., et al., "Commercial LiNBO$_3$ Integrated Optic Devices," *Optics & Photonics News*, pp. 26–30 (Jun. 1995).

Willems, F. W., et al., "Harmonic Distortion Caused by Stimulated Brillouin Scattering Suppression in Externally Modulated Lightwave AM–CATV Systems," *Electronics Letters*, pp. 343–345 ( Feb. 17, 1994).

Willems, F. W., et al., "Simultaneous Suppression of Stimulated Brillouin Scattering and Interferometric Noise in Externally Modulated Lightwave AM–SCM Systems," *IEEE Photonics Technology Letters* pp. 1476–1478 (Dec. 1994).

Tsubokawa, M., et al., "Suppression of Stimulated Brillouin Scattering in a Single–Mode Fibre by an Acousto–Optic Modulator," *Electronics Letters*, pp. 473–475 (Apr. 24, 1986).

Ohkawa, N. and Hayashi, Y., "Reduction of Bit Error Rate Performance Deterioration Caused by Stimulated Brillouin Scattering in High–Power CPFSK Coherent Optical Tranmission Systems," *Electronics Letters*, pp. 515–516 (Mar. 17, 1994).

Sano, A., et al., "10 Gbit/s, 300km Repeaterless Transmission with SBS Suppression by the Use of the RZ Format," *Electronics Letters*, pp. 1694–1695 (Sep. 29, 1994).

Scobey, M. and Stupik, P., "Stable Ultra–Narrow Bandpass Filters," Presented at SPIE's International Symposium, pp. 1–11 (Jul. 1994).

Scobey, M. and Stupik, P., "Improved Temperature and Humidity Stability of Ultra–Narrow Band Filters," 37th Annual Technical Conference Proceedings, pp. 47–52 (1994).

4 Channel Dense Wavelength Division Multiplexer (DWDM), sales brochure, Optical Corporation of America, pp. 1–2 (1995).

Tan, H. H., "CATV Distribution Over an Optical Fiber with a Linearized Mach Zehnder Modulator and RIN Reduced Laser," Cable TV Sessions, Proceedings of the International Television Symposium and Technical Exhibition, pp. 91–96 (Jun. 13–18, 1991).

Nazarathy, Moshe, et al., "Structured Architectures for CATV Distribution with Externally Modulated Solid State Laser Transmitters," Proceedings from Eleven Technical Sessions of the Annual Convention and Exposition of the National Cable Television Assoc., pp. 365–367 (Jun. 6–9, 1993).

Shigeru, M., "Optical Multiplex Transmission System," Patent Abstracts of Japan, 55093338, Jul. 15, 1980 (one page).

WAVELENGTH DIVISION MULTIPLEXING SYSTEM

RELATED APPLICATIONS

This application is a continuation-in-part of International Application No. PCT/US96/03199, filed on Mar. 6, 1996, the entire contents of which is incorporated herein by reference.

BACKGROUND OF THE INVENTION

The invention relates generally to optical communications, and more particularly to the transmission of analog signals in cable television systems using wavelength division multiplexing.

Analog lightwave communication systems are typically used in today's CATV trunking and distribution networks. Trunking applications typically are limited to about 40 video channels per fiber due to CSO and CTB considerations. Thus, to carry 80 video channels and maintain transmission quality requires the use of two fibers.

A need exists for an analog lightwave communication system than can transport a greater number of video channels over a single fiber without degrading CSO and CTB performance.

SUMMARY OF THE INVENTION

The present invention provides an improved analog lightwave communication system for use in CATV trunking applications to provided increased channel capacity over longer distances without performance degradation.

In accordance with an aspect of the invention, a lightwave communication system comprises at least two optical transmitters for providing optical information signals at different optical wavelengths. A first wavelength division multiplexer includes at least two inputs for receiving the optical information signals from the optical transmitters and multiplexes the optical information signals to a composite optical signal at an output. Each input of the first wavelength division multiplexer comprises at least one optical resonant cavity comprising first and second reflecting materials spaced to permit resonance at a selected wavelength. A fiber optic transmission system coupled to the output of the first wavelength division multiplexer receives the composite optical signal.

A preferred embodiment of the system uses at least two, and preferably 3 or 4 sources, each operating at different wavelengths in the range of 1530 nm to 1565 nm. The sources can include a temperature control feedback circuit to maintain the output of each laser at a wavelength corresponding to one of the fixed wavelengths of the multiplexer.

According to another aspect of the present invention, each optical transmitter includes a DFB laser source which provides a continuous wave optical signal and an external modulator coupled to the laser source. An RF driver coupled to an RF electrical input of the external modulator provides an RF information signal for modulating the continuous wave optical signal to produce the optical information signal.

According to another aspect of the invention, an oscillator circuit providing a single tone modulation signal for driving a phase modulator having an optical input coupled to the output of the first wavelength division multiplexer. The single tone modulation signal drives the phase modulator to modulate the composite optical signal such that stimulated Brillouin scattering threshold in the system is increased.

According to another aspect of the invention, an optical monitoring receiver coupled to the output of the first wavelength division multiplexer receives a portion of the composite optical signal and controls the level of the single tone modulation signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE PREFERRED EMBODIMENT

Figure 1:
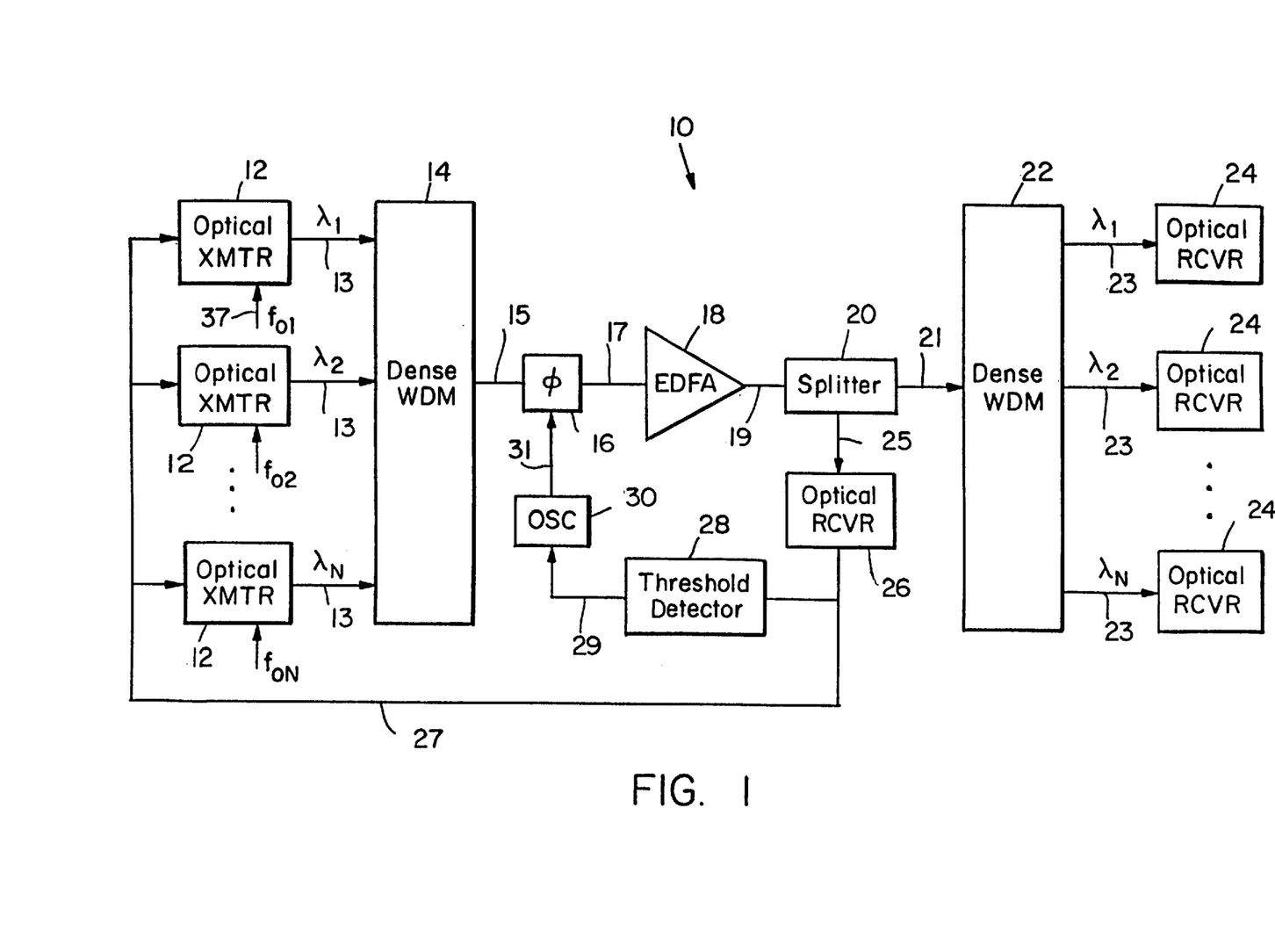
FIG. 1 is a schematic block diagram of an optical communication system in accordance with the present invention.

Referring now to FIG. 1, a communication system 10 is shown which illustrates the principles of the present invention. The system 10 generally comprises optical transmitters 12, dense wavelength division multiplexers 14 and 22, optical amplifier 18 and optical receivers 24. The optical transmitters 12, described in more detail below, output optical information signals 13 each at a different wavelength ($\lambda_1, \lambda_2 \ldots \lambda_N$). The optical information signals 13 are coupled to the WDM 14 which multiplexes the signals to produce a composite optical signal 15 at its output. The composite optical signal 15 includes the optical information signals at the input wavelengths $\lambda_1-\lambda_N$. The WDM 14, described in detail further below, is a dense WDM that includes narrowband interference filter technology to achieve channel spacing on the order of two nanometers or less.

The composite optical signal 15 is coupled to the optical amplifier 18 which provides optical gain. The optical amplifier 18 is preferably an erbium-doped fiber amplifier such as an Italtel AF18A device which provides 18 dBm output power. The amplified composite optical signal 19 is coupled to a remote dense WDM 22 over fiber transmission link 21. The fiber transmission link 21 in the preferred embodiment is a CATV long-haul fiber trunk. The remote WDM 22 demultiplexes the composite optical signal to its constituent optical information signals 23 at the respective wavelengths $\lambda_1-\lambda_N$. The optical receivers 24 each receive a particular optical information signal 23.

Stimulated Brillouin scattering (SBS) is a phenomenon which limits the amount of optical power that can be effectively coupled into a fiber. SBS is particularly difficult in external modulation systems which use an optical source having a relatively narrow optical linewidth. To further exacerbate the problem, systems which employ optical amplifiers can produce gain which surpasses the SBS threshold, typically about 8 dBm in single mode fiber. It should be noted that SBS is a function of spectral linewidth and power and is not dependent on wavelength per se. Willems, F. W. et al., "Harmonic Distortion Caused By Stimulated Brillouin Scattering Suppression in Externally Modulated Lightwave AM-CATV Systems," IEEE Electron. Lett., vol 30, pp. 343–345, February. 1994, and Willems, F. W. et al., "Simultaneous Suppression of Stimulated Brillouin Scattering and Interferometric Noise in Externally Modulated Lightwave AM-SCM Systems," IEEE Photon. Tech. Lett., vol. 6, No. 12, pp. 1476–1478, December. 1994, describe the use of single tone phase modulation applied at frequencies above twice the highest CATV carrier frequency to increase the spectral linewidth of the optical signal and thereby increase the SBS threshold. These references only describe experimental setups and suggest that practical systems may require relatively high electrical powers to achieve the necessary phase modulation index.

It is well known for a phase modulator that the magnitude of $V\pi$, the voltage at which the phase modulation index equals $\pi$, is inversely dependent on electrode length of the phase modulator device. A phase modulator located on a substrate that includes a Mach-Zehnder modulator will have short electrodes and therefore require a large $V\pi$. The preferred embodiment of the present invention instead utilizes a separate phase modulator which can have longer electrodes so that a lower $V\pi$ is required. Further, instead of coupling an individual phase modulator to the output of each optical transmitter in the system 10, a single phase modulator 16 is coupled to the output of the dense wavelength division multiplexer 14.

The SBS suppression circuitry in the preferred embodiment will now be described. The system 10 includes a practical low cost oscillator circuit 30 which generates a single tone modulation signal 31. The oscillator circuit 30 is described in more detail below. The single tone modulation signal 31 is applied to the phase modulator 16 to modulate the composite optical signal 15. The phase modulator 16 provides an optical signal 17 having a number of optical carriers equally spaced in frequency which thereby increases the spectral width of the optical signal. Thus, the phase modulation increases the total power that can be injected into the fiber transmission system before the onset of SBS, thereby increasing the SBS threshold. The single tone modulation signal 31 of oscillator 30 is selected to have a frequency above twice the highest CATV subcarrier frequency to avoid any significant intermodulation distortion from occurring. The preferred frequency for the single tone modulation signal 31 is in the range from about 1.8 GHz to 5 GHz.

The system 10 includes optical receiver 26 coupled to the amplified composite optical signal 19 through a splitter 20. A portion 25 of the amplified composite optical signal 19 is detected in the optical receiver 26 and fed back to a threshold detector 28 which detects the level of Relative Intensity Noise (RIN) and adjusts the output level of the single tone modulation signal 31 provided by oscillator circuit 30 to increase the SBS threshold as required. It should be noted that increasing the SBS threshold too much can cause dispersion effects in the system and thus the feedback is useful in maintaining the oscillator circuit output such that the SBS threshold is increased only as needed. The optical receiver 26 also provides a feedback signal to the optical transmitters 12 for bias control. The optical transmitters 12 include bias control circuitry which is described further below.

Figure 2:
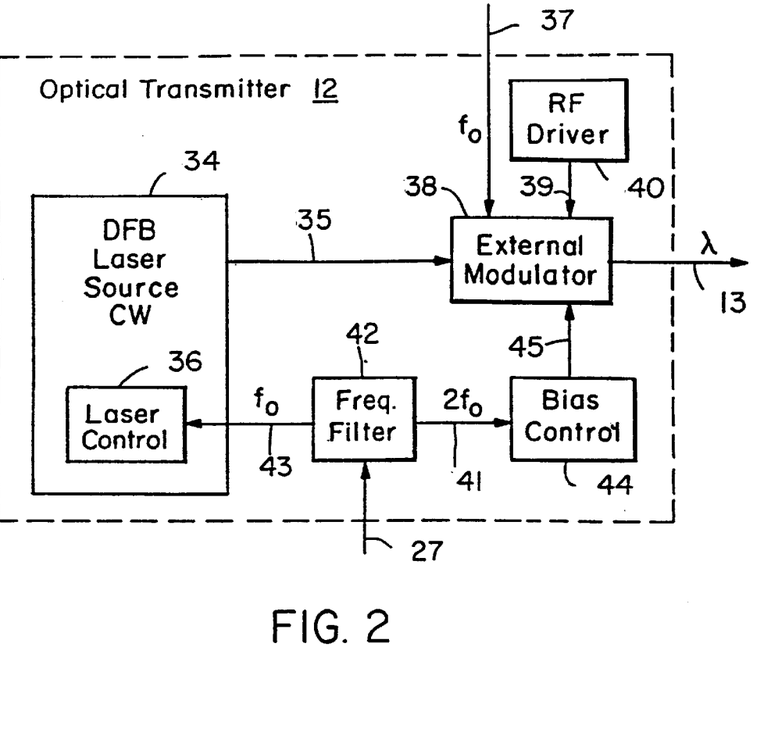
FIG. 2 is a schematic block diagram of an optical transmitter for use in the system of FIG. 1.

Referring to FIG. 2, the optical transmitter 12 is there shown. The optical transmitter 12 includes a DFB laser source 34 operating as a continuous wave laser source, an external modulator 38, an RF driver 40, a frequency filter 42, and a bias control circuit 44. Additional details regarding the use of external modulators in communications systems can be found in International Application No. PCT/US96/03199, filed on Mar. 6, 1996 and entitled "Linear Multi-Output Optical Transmitter System" by Nemecek et al., the entire contents of which is incorporated herein by reference. The DFB laser source 34 provides an optical signal 35 to the external modulator 38. The optical signal 35 is coupled to external modulator 38 which is preferably a Mach-Zehnder modulator formed in lithium niobate. The external modulator 38 is driven by RF driver 40 with an RF information signal 39 to intensity modulate the optical signal 35 and provide optical information signal 13 at its output. The external modulator 38 is maintained at the quadrature point $V\pi/2$ with bias control signal 45 from bias control circuit 44.

The DFB laser source 34 provides 6 mw of power at a nominal wavelength in the range of 1530 to 1565 nm. Across the optical transmitters 12, the wavelengths of the DFB laser sources 34 are preferably separated by about 1.6 nm. The DFB laser source includes a laser controller that employs thermal control to maintain wavelength alignment to the dense WDM 14 (FIG. 1). In addition, a feedback loop is employed to further maintain wavelength alignment. A supervisory dither tone $f_0$ is injected at the external modulator 38 on line 37. The feedback signal 27 provided by optical receiver 26 is filtered by frequency filter 42 and provided to the laser controller 36 on line 43 which adjusts the DFB laser to maximize the level of the received dither tone $f_0$. The dither tone $f_0$ is different for each of the optical modulators 12 to provide for proper discrimination and wavelength alignment. The dither tones are preferably in the range of 4 to 6 MHz.

Because the continuous wave laser source 34 does not produce chirp, the external modulation can be monitored with a single receiver 26 to provide both SBS feedback correction and bias control. A key feature is that the SBS correction is line length independent.

Figure 3:
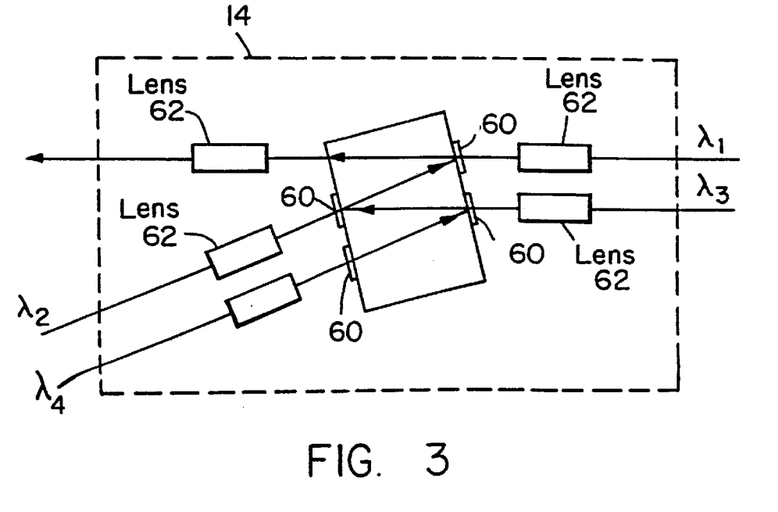
FIG. 3 is a schematic diagram of a dense wavelength division multiplexer for use in the system of FIG. 1.

Referring now to FIG. 3, a preferred embodiment of a dense WDM 14 is there shown. The dense WDM is preferably a device manufactured by Optical Corporation of America. The WDM 14 in FIG. 3 is illustrated as a four channel dense WDM. The WDM 14 comprises multi-cavity MicroPlasma environmentally stable filters (ESF™) 60. Lenses 62 are used to collimate input light before directing the signals at a slight angle through an AR coated facet to filters 60. Wavelengths of light which are inband of the narrowband filter transmit through the filter 60 and all other wavelengths are reflected. In this manner, light cascades in reflection from filter to filter 60 down the device, and with each reflection, a single wavelength is added.

Figure 4:
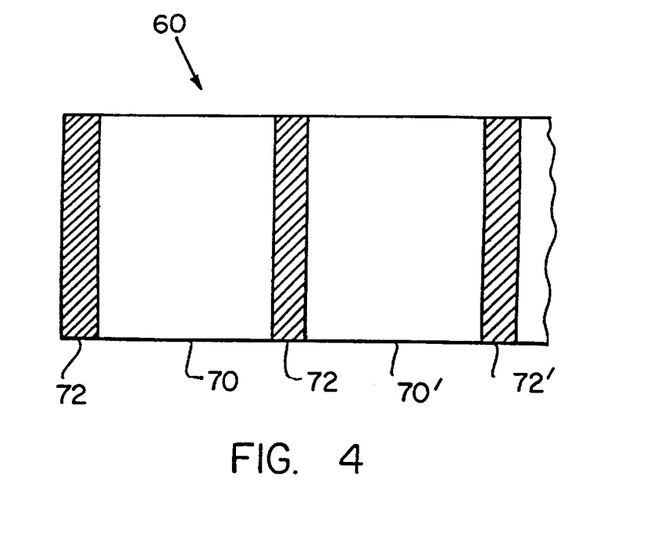
FIG. 4 schematically illustrates a resonant cavity filter arrangement for the dense wavelength division multiplexer of FIG. 3.

Referring to FIG. 4, a filter 60 in the device 14 of FIG. 3 is shown. The narrowband interference filter 60 is, as noted above, a multi-cavity filter comprising a spacer 70 surrounded by dielectric or metallic reflecting stacks 72. The filter 60 transmits at a wavelength at which the spacer 70 defines a Fabry-Perot cavity that has a spacing of an integral number of halfwaves. Thus, the reflecting stacks 72 are spaced accordingly to achieve a particular filter wavelength. A two-cavity device is shown in FIG. 4 in which a second spacer 70' is surrounded by dielectric or metallic reflecting stacks 72 and 72'. Metal oxide or metal reflecting coatings are used in these filters to provide improved thermal stability over the operating range of the system, where the layers are formed by plasma deposition. Further details regarding the characteristics of these filters can be found in "Improved Temperature and Humidity Stability of Ultra-Narrow Band Filters" by Scobey and Stupik in the 37th Annual Technical Conference Proceedings (1994) of the Society of Vacuum Coaters, the entire contents of which is incorporated herein by reference. Metal oxide mirrors that are temperature and humidity stable may also be fabricated using ion-assisted deposition techniques.

Another WDM that can be used in conjunction with the present invention is an echelon grating system described in greater detail in U.S. Pat. No. 4,715,027, the entire contents of which is incorporated herein by reference.

Figure 5:
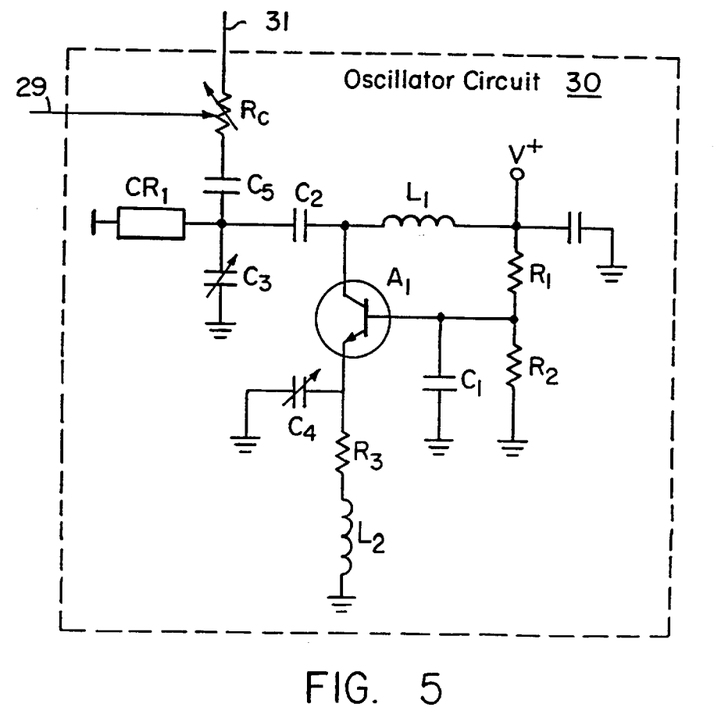
FIG. 5 is a schematic diagram of an oscillator circuit for providing single tone phase modulation in the system of FIG. 1.

Referring now to FIG. 5, an embodiment of the oscillator circuit 30 is shown. The oscillator circuit 30 includes a coaxial resonator $CR_1$. The coaxial resonator $CR_1$ is preferably a coaxial ceramic resonator having a shorted end face which functions as a quarter wave resonant line circuit. The ceramic resonator is preferred over other coaxial line resonators because of its smaller size dimensions, higher Q, and better high temperature stability. The ceramic resonator $CR_1$ can be, for example, a device supplied by Alpha or Kyocera. The required oscillator frequency in the range of about 1.8 GHz to 5 GHz is obtained by using an appropriate resonator and by fitting suitable capacitor and inductor elements. The amplifier A1 is tuned appropriately to provide a high Q. A composite ceramic resonator with dual coefficients is preferred for stability. The low cost design of the oscillator circuit 30 provides a pure tone for an effective implementation. The output level of the oscillator circuit 30 is controlled by a control signal 29 received from threshold detector 28 (FIG. 1).

In analog lightwave communication systems which use external modulation, such as described in U.S. Patent Application Ser. No. 08/563,678 filed Nov. 28, 1995, the entire contents of which is incorporated herein by reference, bias control of the external modulator can be achieved by injecting supervisory tones and monitoring the output optical signal for second order products of the supervisory tones. It is important to note that some CSO, for example, at −80 dBc is useful for bias control.

Figure 6A:
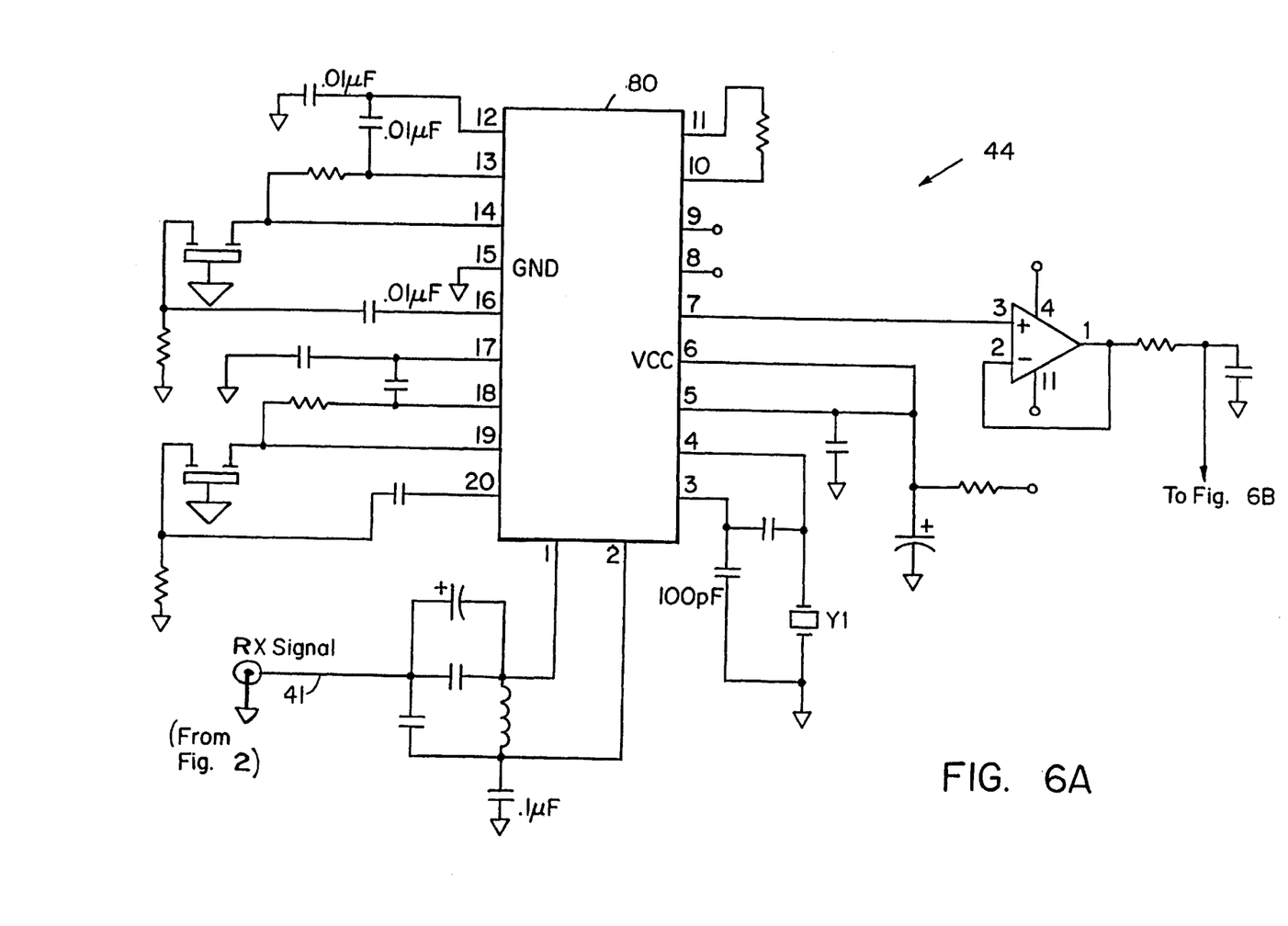
FIG. 6 is a schematic diagram of an automatic bias control circuit for use in the system of FIG. 1.
Figure 6B:
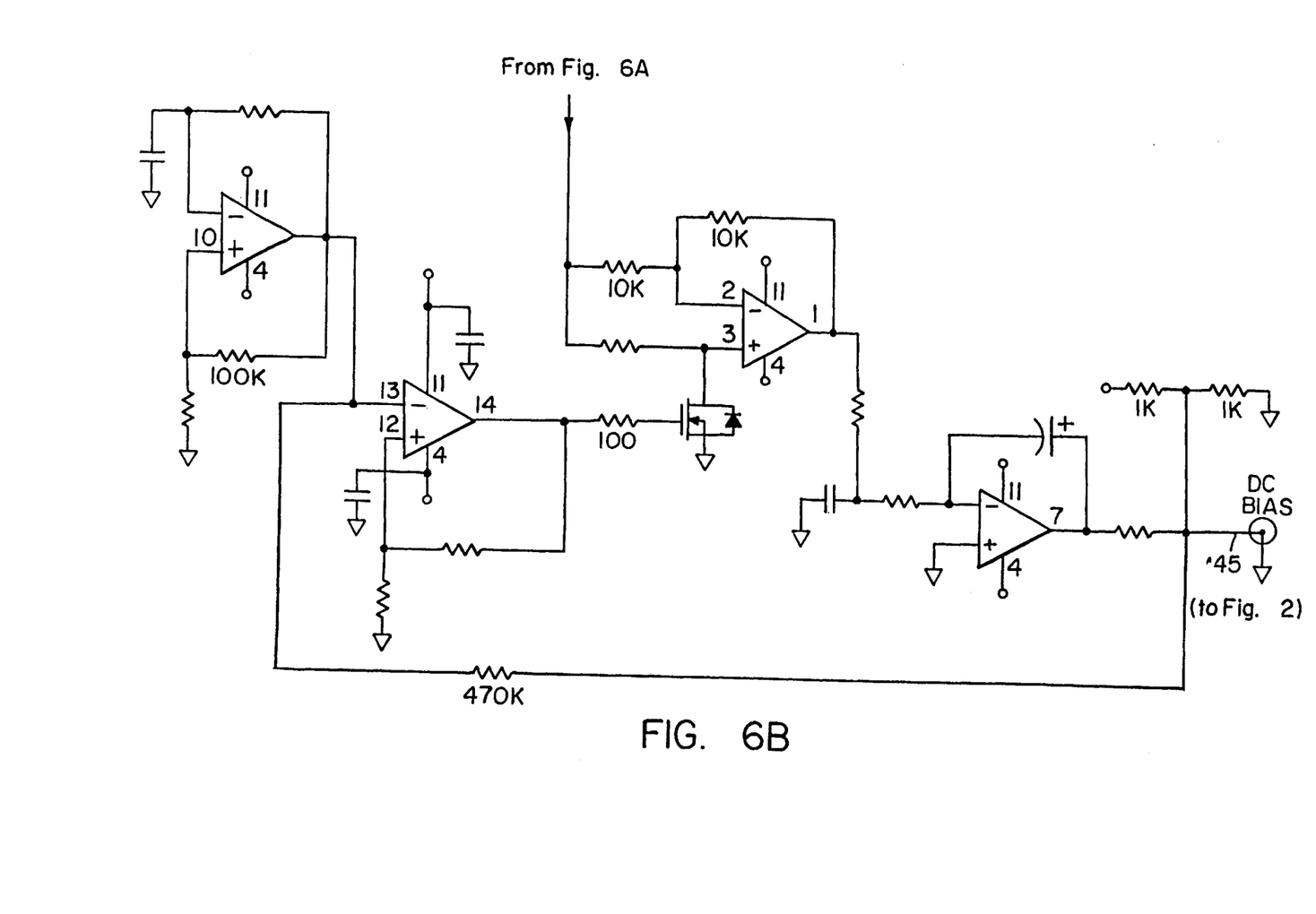

Referring now to FIG. 6, the automatic bias control circuit 44 there shown is a second harmonic detector that includes a mixer FM IF integrated circuit 80 which is preferably a Phillips NE605D integrated circuit. The NE605D is a combination mixer and FM receiver which includes a received signal strength indicator (RSSI).

The second order distortion can be prevented by biasing the external modulator 38 (FIG. 2) at ½ of the half wave voltage otherwise known as $V_\pi$. Since the optimum bias point can drift with temperature, the system must use a control loop to actively keep the bias adjusted to the optimum level.

The amplitude response of the second harmonic versus control voltage has a "V" shape. The ABC circuit detects the slope to determine which direction to adjust the bias voltage. A positive slope indicates that the voltage is to the right of the minimum and must be decreased. A negative slope indicates that the bias is to the left of the minimum and must be increased.

The ABC circuit accomplishes this by using a dither signal. This is a very small (≈30 mV) AC signal which is superimposed on the modulator DC bias shown in FIG. 2 at line 37. Since the bias is moving, the second harmonic level will also move slightly which in turn causes a change in the RSSI level. If the DC bias is lower than the optimum voltage, the RSSI will decrease when the dither signal is positive, and increase when it is negative.

A difference amplifier operates, when the DC voltage is too low, such that the positive delta is multiplied by −1 and the negative delta is multiplied by +1. This results in an error signal which is negative. This error signal is then input to an inverting integrator. Therefore, the output from the integrator will be positive and the bias will move towards the optimum voltage. The same explanation is used when the DC bias is greater than optimum, with the obvious exception that the circuit will decrease the bias voltage.

Ideally, when the loop is locked, the output should be a pure DC signal. A real circuit will produce some very small residual error signal, mostly due to the non-ideal performance of the difference amplifier.

The noise level input to the receiver is approximately −97 dBm in a 3 kHz BW. This translated into −93 dBm in a 7.5 kHz BW. Since the input level of the second harmonic, when nulled, is approximately −95 dBm, the system is working with a S/N ratio less than 0.

The system will still work due to two important factors:
  It is only necessary to see a change in RSSI for a change in second harmonic level.
  The integrator BW also lowers the noise equivalent BW and allows the system to perform in poor S/N environments.

The ultimate performance of the loop is really limited by the change in RSSI for a given change in signal level. The following table shows the total power change for various S/N ratios for a 1dB change in input signal level.

| S/N | Δ Power |
|---|---|
| dB | dB |
| +3 | +0.60 |
| +2 | +0.59 |
| +1 | +0.47 |
| 0 | +0.47 |
| −1 | +0.41 |
| −2 | +0.36 |
| −3 | +0.31 |
| −4 | +0.26 |
| −5 | +0.22 |
| −6 | +0.18 |

This table is important as it demonstrates that for negative S/N ratios, it is still possible to see a change in RSSI for a change in input level (i.e., change in the level of the second harmonic of the pilot tone). However, the RSSI has a sensitivity of 40 m V/dB so at an S/N level of −6 dB, the RSSI change will only be 8 mV. This means that op-amp offset errors become very important to the operation of the loop.

It is very important that rejection of the fundamental is sufficient to prevent the fundamental from generating a second harmonic in the receiver which would cause problems for the loop. The second order intercept must be high enough to prevent this from happening.

The receiver section uses an IF of 10.7 MHz to allow for the use of standard crystal filters. The input signal, which is the second harmonic of the test tone, is 3.6864 MHz. This signal is converted to 10.700 MHz by a high-side mix with the 14.3864 MHz oscillator. Due to the narrow BW of the crystal filters a custom crystal is necessary to keep the oscillator at the correct frequency.

In order to maintain the signal within the passband of the crystal filters, the total frequency error must be kept less than 350 ppm. The oscillator crystals are 150 ppm over temperature, leaving a 200 ppm error allowed in the 1.8432 MHz crystal. These values are within standard tolerances.

The mixer has a very high input impedance (~4.5 kO) so an optimum match to 500 is difficult. For simplicity a tapped-C match is used. The image frequency protection needs to be reasonable ($\geq 20$ dB), since the second order products from the CATV signals may end up falling at the image and interfering with proper operation of the loop. In order to maintain reasonable Q of the circuit, the input match must be tuned by adjusting a trim cap. The capacitor simply needs to be tuned to maximize RSSI.

The local oscillator is a Colpitts configuration using the NE605 oscillator transistor, a 14.3864 MHz crystal, and 2 capacitors. The peak-peak level at the input to the NE605 is approximately 200 mV. Due to the high level of incoming noise caused by the laser/modulator, it is also important to use a narrow BW. The current configuration uses crystal filters of ±3.75 kHz BW.

Alternatively, it is well known that discrete frequencies are already available in a CATV signal spectrum that can analyzed for distortion. For example, channels 3 and 4 are typically available as carrier frequencies at 61.25 MHz and 67.25 MHz respectively since they are generally required for signal conversion at a CATV set top box. The second order products fall +/−1.25 MHz away from the carrier frequencies. Additionally, channels 5 and 6 produce CSO at 4.5 MHz and 6 MHz respectively. A heterodyne approach can be used to take advantage of the available carrier frequencies and obviate the need for injecting supervisory tones.

While this invention has been particularly shown and described with references to preferred embodiments thereof, it will be understood by those skilled in the art that various changes in form and details may be made therein without departing from the spirit and scope of the invention as defined by the appended claims. For example, the DFB laser sources 34 can be directly modulated by the RF driver rather than using external modulation.

What is claimed is:

1. An analog lightwave communication system comprising:
   at least two optical transmitters for providing analog optical information signals at different optical wavelengths;
   a first wavelength division multiplexer having at least two inputs for receiving the optical information signals from the optical transmitters and for multiplexing the optical information signals to a composite optical signal at an output, each input of the first wavelength division multiplexer comprising at least one optical resonant cavity comprising first and second reflecting materials spaced to permit resonance at one of the different optical wavelengths;
   an oscillator circuit providing a single tone modulation signal:
   a phase modulator having an optical input coupled to the output of the first wavelength division multiplexer for receiving the composite optical signal and an electrical input coupled to the oscillator circuit for receiving the single tone modulation signal, the single tone modulation signal driving the phase modulator to modulate the composite optical signal such that stimulated Brillouin scattering threshold in the system is increased; and
   a fiber optic transmission system coupled to the output of the first wavelength division multiplexer for receiving the composite optical signal.

2. The system of claim 1 wherein each optical transmitter comprises a DFB laser source which provides a continuous wave optical signal; an external modulator coupled to the laser source having an RF electrical input; and an RF driver coupled to the RF electrical input of the external modulator which provides an RF information signal for modulating the continuous wave optical signal to produce the optical information signal.

3. The system of claim 1 further comprising an optical receiver coupled to the output of the phase modulator for receiving a portion of the phase modulated composite optical signal and a noise threshold detector coupled to the optical receiver for detecting noise level in the composite optical signal to control the level of the single tone modulation signal.

4. The system of claim 2 wherein the RF information signal comprises at least 40 cable television channels.

5. The system of claim 1 further comprising an optical amplifier coupled between the output of the first wavelength division multiplexer and the fiber optic transmission system.

6. The system of claim 5 wherein the optical amplifier is an erbium-doped fiber amplifier.

7. The system of claim 1 wherein the fiber optic transmission system comprises a second wavelength division multiplexer for demultiplexing the composite optical signal to the optical information signals at different wavelengths and at least two optical receivers, each receiver for receiving one of the optical information signals at a respective wavelength.

8. The system of claim 1 wherein each optical transmitter comprises a DFB laser source that is directly modulated with an RF information signal.

9. The system of claim 8 wherein the RF information signal comprises at least 40 cable television channels.

10. The system of claim 1 wherein the first wavelength division multiplexer provides a wavelength separation of less than 2 nm.

11. The system of claim 10 wherein the wavelength separation is less than 1.6 nm.

12. An analog lightwave communication system comprising:
    at least two optical transmitters for providing analog optical information signals at different optical wavelengths, each optical transmitter comprising:
      a DFB laser source which provides a continuous wave optical signal;
      an external modulator coupled to the laser source having an RF electrical input; and
      an RF driver coupled to the RF electrical input of the external modulator which provides an RF information signal for modulating the continuous wave optical signal to produce the optical information signal;
    a first wavelength division multiplexer having at least two inputs for receiving the optical information signals from the optical transmitters and for multiplexing the optical information signals to a composite optical signal at an output;
    an oscillator circuit providing a single tone modulation signal; and
    a phase modulator having an optical input coupled to the output of the first wavelength division multiplexer for receiving the composite optical signal and an electrical input coupled to the oscillator circuit for receiving the single tone modulation signal, the single tone modulation signal driving the phase modulator to modulate the composite optical signal such that stimulated Brillouin scattering threshold in the system is increased.

13. The system of claim 12 further comprising an optical receiver coupled to the output of the phase modulator for receiving a portion of the phase modulated composite optical signal and a noise threshold detector coupled to the optical receiver for detecting noise level in the composite optical signal to control the level of the single tone modulation signal.

14. The system of claim 12 further comprising a fiber optic transmission system coupled to the output of the first wavelength division multiplexer for receiving the composite optical signal.

15. The system of claim 14 wherein the fiber optic transmission system comprises a second wavelength division multiplexer for demultiplexing the composite optical signal to the optical information signals at different wavelengths and at least two optical receivers, each receiver for receiving one of the optical information signals at a respective wavelength.

16. The system of claim 14 further comprising an optical amplifier coupled between the output of the first wavelength division multiplexer and the fiber optic transmission system.

17. The system of claim 16 wherein the optical amplifier is an erbium-doped fiber amplifier.

18. The system of claim 12 wherein the RF information signal comprises at least 40 cable television channels.

19. An analog lightwave communication system comprising:

at least four optical transmitters for providing analog optical information signals at different wavelengths between 1530 and 1565 nm;

a first dense wavelength division multiplexer having at least four inputs for receiving the optical information signals from the optical transmitters and for multiplexing the optical information signals to a composite optical signal at an output;

an oscillator circuit providing a single tone modulation signal;

a phase modulator having an optical input coupled to the output of the first wavelength division multiplexer for receiving the composite optical signal and an electrical input coupled to the oscillator circuit for receiving the single tone modulation signal, the single tone modulation signal driving the phase modulator to modulate the composite optical signal such that stimulated Brillouin scattering threshold in the system is increased;

an optical amplifier for amplifying the composite optical signal;

a fiber link for transporting the amplified composite optical signal to a remote site; and a second dense wavelength division multiplexer coupled to the fiber link at the remote site for demultiplexing the composite optical signal to the optical information signals.

20. The system of claim 19 wherein the optical amplifier is an erbium-doped fiber amplifier.

* * * * *